July 9, 1963 R. A. HODGSON 3,096,645
COMPENSATED INTEGRATOR

Filed May 1, 1958 4 Sheets-Sheet 1

INVENTOR.
Robert A. Hodgson
BY Arthur L. Wade

July 9, 1963
R. A. HODGSON
3,096,645
COMPENSATED INTEGRATOR
Filed May 1, 1958
4 Sheets-Sheet 2
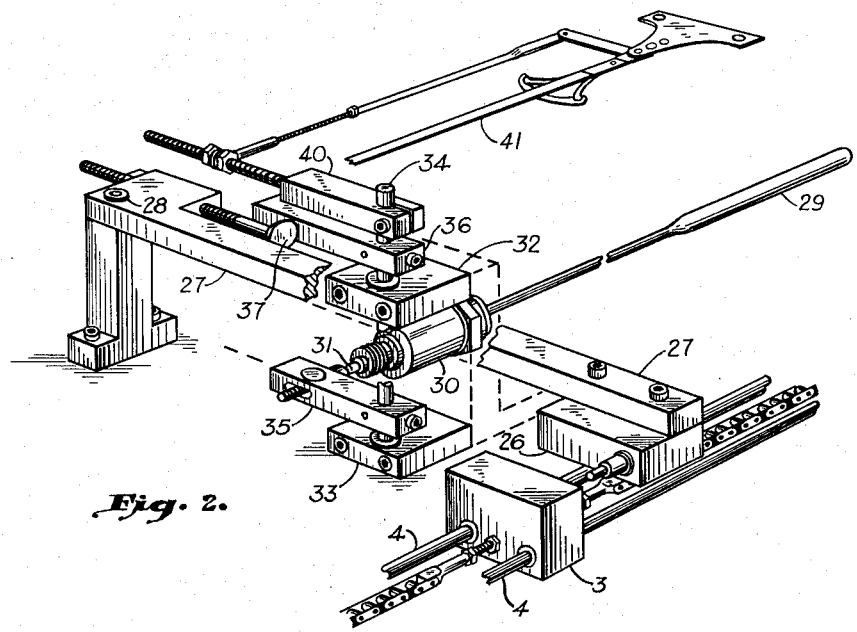
Fig. 2.
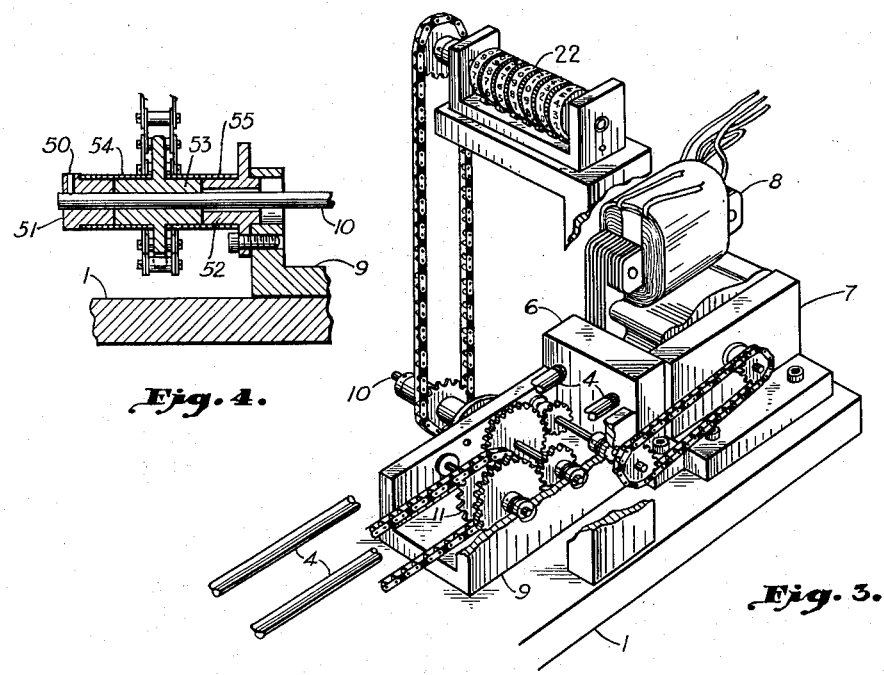
Fig. 4.
Fig. 3.
INVENTOR.
Robert A. Hodgson
BY Arthur L. Wade July 9, 1963 R. A. HODGSON 3,096,645
COMPENSATED INTEGRATOR
Filed May 1, 1958 4 Sheets-Sheet 3

INVENTOR.
Robert A. Hodgson
BY Arthur L. Wade

July 9, 1963

R. A. HODGSON 3,096,645

COMPENSATED INTEGRATOR

Filed May 1, 1958

INVENTOR.
Robert A. Hodgson
BY
Arthur L. Wade

United States Patent Office 3,096,645
Patented July 9, 1963

3,096,645
COMPENSATED INTEGRATOR
Robert Arthur Hodgson, Tulsa, Okla., assignor to National Tank Company, Tulsa, Okla., a corporation of Nevada
Filed May 1, 1958, Ser. No. 732,233
10 Claims. (Cl. 73—223)

The invention relates to integrating devices for volume measuring meters. More specifically, the invention relates to ways of compensatoing the integrating devices with a variable which changes the volume of the material metered.

The various fluids produced by an oil well are usually separated in proximity to the wellhead and fed to a gathering system of pipelines. Customarily, the liquid hydrocarbon portion of the fluids have been stored in tanks and manually gauged as part of the procedure whereby the owner of the pipeline accepts the oil taken into the pipeline from the tanks.

Recently, various systems have been developed for automatically measuring the oil in saleable condition and promptly delivering it to the pipeline. These lease automatic custody transfer systems generally include, as an essential function, the filling and emptying of a container between predetermined levels. The result is the volume of the tank, or container, filled with oil between these levels becomes the measure of the total quantity passed to the pipeline if provision is made to totalize, or integrate, the number of times the tank is filled and dumped.

Some means must be provided for flowing only saleable oil through the transfer system. Then, when saleable oil flows through the system, the variation of its net quantity by several factors must be taken into account. Although the percentage of bottom sediment and water in the saleable oil may be within acceptable limits, its quantity may still vary over a number of integrated measuring tank readings. More immediately important, the temperature variations of the metered oil spreads the difference between the integrated reading of the number of times the tank is dumped and the net quantity of saleable oil passed through the measuring system. The integrator, or counter, which exhibits the tank dumps, requires at least continuous adjustment by temperature in order for the readings to form an accurate basis for sales to the owner of the pipeline. The present invention provides this compensation of the integrator.

The present invention is embodied in an apparatus which utilizes some form of motive power to reciprocate an object-body in a path. The motive power is placed under the direction of signals developed when a container, or tank, is filled and emptied with the material measured. The compensating variable is caused to generate a signal to modify control of the motive means by the filling and dumping cycle. The primary object of the invention is to fix the length of the reciprocation path of the object-body in proportion to the net volume of metered material dumped by a tank and translate the length of the path into a record of the volume passed through the tank, thus corrected.

Another object of the invention is to establish the length of a path between two points in proportion to the net units of saleable oil, as the material dumped by a tank, and to shift one point toward, or away from, the other point in accordance with the temperature variations of the oil dumped as an object-body is reciprocated over the path.

Another object of the invention is to establish the distance between two end points of a path of an object in proportion to the net barrels of saleable oil dumped by a tank and to provide adjustment of the proportionality between the movement of one of the points and the mechanism responding to temperature of the oil dumped by the tank.

Another object is to insure complete reciprocation of a registering device over a path between two points spaced a distance apart proportional to the net barrels of saleable oil dumped by a tank each time the tank is dumped and filled.

The present invention contemplates controlling a motive means to reciprocate an object-body in a path. The control circuit for the motive means includes switches which are placed so they will be contacted by the object-body at each end of the path in fixing the distance the object is carried along the path proportional to the net barrels of saleable oil filled and dumped by a tank during the complete cycle of reciprocation. This arrangement provides for the motive means to be energized to start each half of the reciprocation cycle under the command of signals developed at predetermined levels in the tank. Finally, the motion of the mechanism moving the object over one-half of the reciprocation cycle is employed to actuate a register to totalize, or integrate, the dumps in units such as net barrels.

The invention further contemplates controlling the circuit of the motive means to reciprocate a slider, as the object, body, when the tank is filled and emptied of saleable oil; the circuit of the motive means is so controlled as to accurately stop the slider at switch points established at each end of the slider path. One of the switches which fixes an end point of slider travel is continuously repositioned along the path in accordance with the temperature of the oil passing through the tank, thus determining the path length as representative of the net barrels of oil passing through the tank. The register is actuated by the motive means at the time the slider is carried over half of its reciprocation cycle to integrate the tank dumps in terms of net barrels.

The invention further contemplates that the switch continuously repositioned is so actuated from a temperature responsive mechanism, through a linkage capable of being adjusted, in further compensation of the slider travel in accordance with the specific gravity of the oil being metered.

The invention further contemplates that the circuit of the motive means, controlled from the level devices, include time delay relays to insure that the slider is carried through each half of its reciprocation cycle independent of the time required to empty or fill the tank.

Other objects and advantages and features of this invention will become more apparent to one skilled in the art upon consideration of the written specification, appended claims and attached drawing wherein;

FIG. 2 is a perspective of that part of FIG. 1 specifically related to the mechanism compensating the integrator for temperature;

FIG. 3 is a perspective of that part of FIG. 1 showing the motive means and its coupling to the register, or counter and the slider;

FIG. 4 is a cross section in elevation of the clutch between the register, or counter, and the gear box of the motive means.

Figure 1:
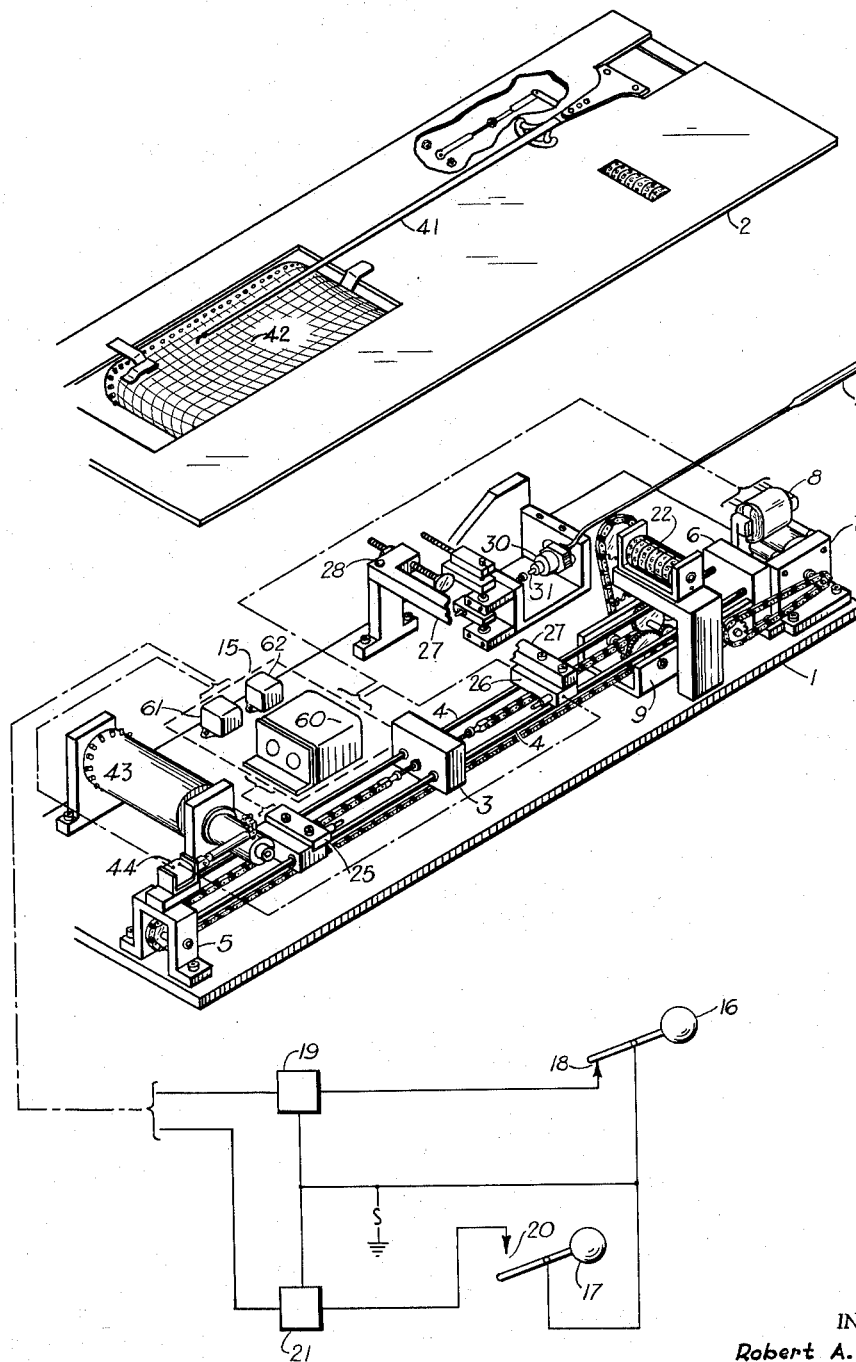
FIG. 1 is an isometric, and somewhate diagrammatic, illustration of a complete system, including the integrator, in which the present invention is embodied.

FIGS. 1–3 should be considered together as FIGS. 2 and 3 are but enlarged views of portions of FIG. 1. Basic orientation begins with base plate 1 upon which the majority, and essential, structure of the integrator is mounted. A front cover plate 2 is shown above base 1, vertically exploded sufficiently to provide a clear view of the structure mounted on base 1.

Attention is directed to slider-block 3 which is on guide rods 4. Rods 4 have support brackets 5 and 6 supporting them from their ends. Sliding on rods 4, block 3 is provided a fixed path of reciprocation in carrying out the objects of the invention. It is the length of this reciprocation path, traversed by block 3, which the invention makes proportional to the net barrels of the saleable oil dumped by a measuring tank. This length is translated into a record of the net barrels passed through the tank. Basically, this function is carried out by providing a motive means to move the block 3 over its reciprocation path, structure with which to control the circuit of the motive means, and structure with which to translate the movement of the motive means into an exhibited integration.

Immediately to the rear of guide support bracket 6, drive motor bracket 7 is mounted, viewed to best advantage in FIG. 3. The output shaft of motor 8 is extended through bracket 7 to carry a sprocket linked through a chain to a sprocket of the gears in housing 9. With the reduction gears, motor 8 drives shaft 10 to actuate a counter, or register, and sprocket 11 which drives a chain attached to block 3.

Motor 8 is controlled in its driving of the counter and slider-block 3. The control is exerted with a power pack 15, diagrammatically illustrated in FIG. 1 as interconnecting motor 8 through various switches to a line supply of electrical power. Two of these switches are illustrated diagrammatically in FIG. 1 as controlled by level devices in a measuring tank, specifically shown as floats.

Top float 16 senses when the measuring tank, not shown, has been filled to the predetermined level. Bottom float 17 senses when the tank level has been returned to the predetermined minimum level. The volume of liquid which is alternately filled and dumped between these floats 16 and 17 is integrated as a cumulative total. With the volume of the tank known, between these two levels, the counter, or register, can be suitably geared to exhibit this volume in terms of any desired units, such as barrels. The cumulative total of this counter is then the integration exhibited as the broad function of the invention. More specifically, continuous adjustment of this integration to keep it in terms of net barrels of oil is the ultimate function of the invention.

Returning to the specific function of the floats, float 16 is illustrated in its raised position. In this raised position, switch 18 is closed, indicating that the tank has been filled. Closure of switch 18 controls power pack 15 to actuate motor 8 to drive slider 3 upward and to the right as viewed in FIG. 1. As the tank valves are controlled to dump as soon as float 16 has been raised, float 16 may break switch 18 before slider 3 has completed its travel to the right. Therefore, a time delay relay 19 has been shown as maintaining the circuit between power pack 15 and the line for a predetermined length of time. This predetermined length of time is adjusted to insure that slider 3 completes its full travel to the right.

When the tank empties down to the level of float 17, float 17 lowers and closes switch 20. Closure of switch 20 actuates power pack 15 to cause motor 8 to drive the slider down and to the left as viewed in FIG. 1. Again, to isolate the action of float 17 in reopening switch 20 as the tank valves begin to fill the tank, a time delay relay 21 has been utilized to keep the circuit of power pack 15 completed to the line for the time necessary to drive slider 3 through its full travel to the left.

It should now be appreciated that the basic function of reciprocating slider-block 3 over the fixed path defined by guide-rods 4 is controlled by the combination of the floats, their switches and the time delay relays. During half of the cycle of reciprocation, a counter 22 is driven through the gears of housing 9 to indicate how much oil has been dumped by the tank. However, other structure in which the invention is embodied determines the precise distance block 3 is caused to travel as being proportional to the barrels of oil in each dump of the tank, corrected to a predetermined value of a factor, such as temperature.

Broadly, the invention contemplates establishing the end points of the fixed path for slider 3 with switches 25 and 26. Switches 25 and 26 are included in the circuit of power pack 15 to dynamically brake motor 8 with great accuracy at the switch points. Thus, on each half of the cycle of reciprocation, slider 3 is held at one of the end points of its travel by a switch until the proper float closes its switch and causes the motor to reverse the travel of slider 3. The specific arrangement of switches 25, 26 and 18, 20 in the circuit of power pack 15 to accomplish this function will be analyzed with FIGS. 5–8. With FIGS. 1–3 it is disclosed how switches 25 and 26 are positioned to define the precise length of the fixed path of rods 4 which can be translated into a cumulative total on counter 22.

The present invention utilizes switch 25 to establish the bottom limiting point. The switch 25 is mounted on rods 4 at a position representing the basic calibration between the tank volume and counter 22. This position is determined to set a length of travel for the slider 3 during which the counter is actuated to register net barrels of oil when switch 25 is at a position representative of standard temperature, usually 60° F. Then, when switch 26 is shifted to either side of its standard temperature position by the actual temperature of the oil, the net, or standard, barrels of oil passing through the tank are accurately exhibited by counter 22.

Switch 26 is positioned along the fixed path by a system of levers actuated by a system responsive directly to the temperature of the oil passing through the tank. FIG. 2 shows this lever system to best advantage. Anyone skilled in the art can understand the mechanical arrangement with this illustration of the essential lever arms and their pivots. Switch 26 is mounted on one end of switch lever arm 27. Pivot point 28 is established for the other end of lever arm 27 as far as reasonably possible from switch 26 in order to swing switch 26 through as little of an arc as reasonably possible. From the other end of the system, a temperature transmitter bulb has been illustrated as responsive to tank temperature to expand and contract its fluid system, including receiver 30. This fluid system positions plunger 31 over a range of positions representative of temperature. The mechanical motion of this plunger 31 is utilized to position the lever system to which switch 26 is attached.

Bearing blocks 32 and 33 are arranged to establish a vertical axis for shaft 34. Bottom temperature adjustment lever 35 is rotated about the axis of shaft 34 by plunger 31. With lever 35 fixed to shaft 34, shaft 34 rotates top temperature adjustment lever 36. To complete the system, only an adjustable fulcrum point between lever 36 and lever 27 is needed. An adjustable fulcrum point is embodied in roller 37 which is carried on a threaded shaft which can be locked at various distances from pivot point 28.

This system of levers between switch 26 and temperature transmitter bulb 29 provides for the positioning of switch 26 over a range of positions substantially linear along the fixed path of rods 4, proportional to the temperature of the oil in the tank being filled and dumped. The mechanical advantage of this lever system is adjusted by positioning roller 37 with respect to pivot point 28. This adjustment is desirable in view of the variation of specific gravity in the oils handled by the tank. As this specific gravity changes, the change in the volume of the oil with respect to temperature changes. It is conceivable that this adjustment could be made automatic. However, change in specific gravity is not sufficiently frequent to justify the complication of an automatic system.

It should now be apparent that the objects of the invention are broadly obtained by the establishment of the fixed path for slider-block 3 and the length of that path by the position of switches 25 and 26. With the length of the path fixed by the factors varying the net barrels of oil passing through the tank, actuation of counter 22 proportional to the length of the path obtains an integration on a basis of net barrels handled by the tank. There remains to disclose but the details of the circuit and structures which carry out, and depend upon, this basic structural co-operation in which the invention is embodied.

One feature made possible by this embodiment of the invention is convenient recordation of the temperature. As shaft 34 is positioned proportional to temperature, a pen arm lever 40 is attached to the shaft as one end of the lever system to a recording pen 41. A chart 42 is provided on which the pen places its permanent record. The chart is disclosed as a roller type advanced by a cylinder 43. Cylinder 43 is powered by a solenoid 44 included in the circuit of power pack 15. Thus, the chart is advanced in synchronism with the actuation of power pack 15 and the temperature variation is recorded in step with the filling and emptying of the measuring tank.

Another feature of this embodiment of the invention is the arrangement whereby the motion of motor 8 is transmitted through the gears of housing 9 to counter-register 22 and the motion of solenoid 44 is transmitted to chart cylinder 43. Representative of both clutch mechanisms for giving unidirectional movement, FIG. 4 is established to illustrate the clutch on the end of shaft 10.

In FIG. 4, base plate 1 is shown with the vertical wall of gear housing 9 through which shaft 10 extends. For clarity, the bearing between shaft 10 and the aperture in housing 9 has not been shown. Shaft 10 is illustrated as pinned at 50 to counter drive clutch hub 51. Shaft 10 is journalled through counter drive backstop clutch hub 52. Backstop clutch hub 52 is fixed to the wall of housing 9. Journalled on shaft 10, between the two hubs, is sprocket 53. When a proper connection is made between hub 51 and sprocket 53, reciprocation of shaft 10 by motor 8, as it shuttles slider 3, turns counter 22 in one direction to accumulate the number of volume units of oil dumped by the tank.

The required connection between the sprocket and hubs is made by the use of helical springs arranged on each side of sprocket 53 and bridging its junctions with the hubs. These springs 54 and 55 are desirably of square cross section and are wound in opposite directions to each other. The frictional engagement between spring 54, hub 51 and sprocket 53 will cause the spring to tighten and complete a fixed union between hub and sprocket when hub 51 is rotated in one direction. As hub 51 is rotated in the other direction spring 54 will expand sufficiently to permit slippage between hub 51 and sprocket 53. The reverse action is accomplished by spring 55 arranged between sprocket 53 and 52. Thus, as shaft 10 reciprocates in its rotation, sprocket 53 is rotated in only one direction. An arrangement similar to FIG. 4 is provided between the plunger of solenoid 44 and chart drive cylinder 43. The only difference remains in which hub is made to drive and which hub is driven through the clutch. The same basic arrangement of oppositely wound springs provides the unidirectional advancement of cylinder 43 as the actuating piston of solenoid 44 is reciprocated by the signals from power pack 15.

Specific reference may now be made to FIGS. 5-8 in which the function of the electric circuit is somewhat diagrammatically illustrated in four steps of its operation. The structure actuated by the circuit has been duplicated in each of these four figures. Within each figure, slider-block 3 is illustrated at different stages of reciprocation between bottom limiting switch 25 and top limiting switch 26. The drive motor 8 which mechanically shifts the position of slider-block 3 is illustrated as electrically connected into the circuit. Solenoid 44, which advances the chart cylinder 43 is oriented in an appropriate physical relation and electrically actuated in proper time sequence in FIG. 6.

Power pack 15, of the preceding illustrations, is now shown as broken down into its three relay components. The essential elements of these relays are illustrated as double pole switches alternated between their two positions by the electrical energy placed on their coils.

Latching relay 60 is composed of two sections, each section comprised of two double pole switches. The mechanical connection, although diagrammatically illustrated here, has the specific characteristic of causing the shifting of both switches of each section when alternate coils are energized. However, the switches of each section will both remain in the last position to which they were switched until the alternate coil is energized.

Forward brake relay 61 and reverse brake relay 62 are each comprised of a pair of double pole switches. However, in contrast to the actuation of latching relay 60, these relays 61 and 62 are provided with a spring to return their two switches to a predetermined position when their coils are de-energized, assuming their alternate position only when their coils are energized.

The convention used in illustration is to have the pair of contacts nearest the coil made when the coil is energized and other two contacts automatically made by the return spring when the coil is de-energized. For convenience of description, the double pole switches of each section will be referred to as having top and bottom contacts. The contacts being right or left in their respective double pole switch. Thus, latching relay 60 has a top and bottom section, each of whose two sets of switches are mechanically connected to be actuated simultaneously between their two positions.

Figure 5:
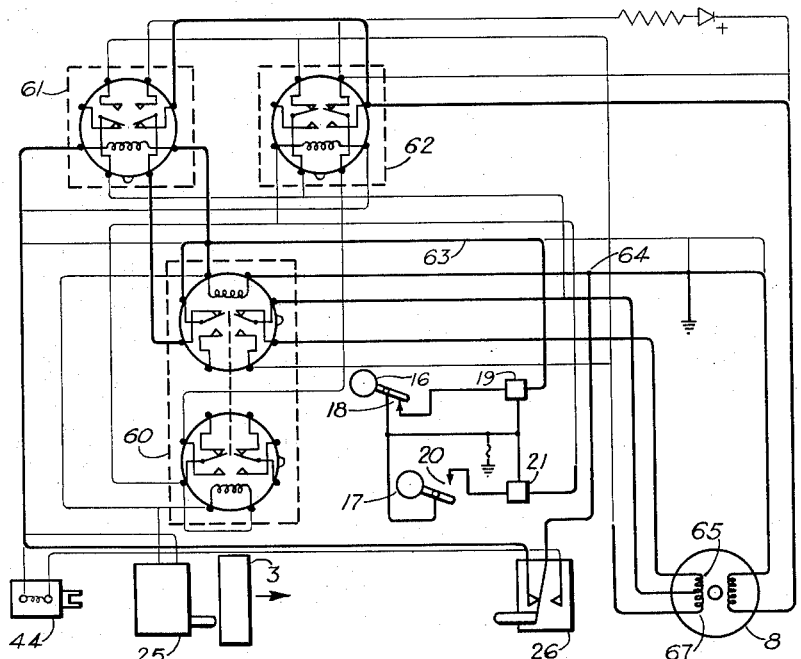
FIGS. 5–8 are each schematic illustrations of a control circuit for the motive means, in various stages of its actuation by the switches of the integrator.
Figure 6:
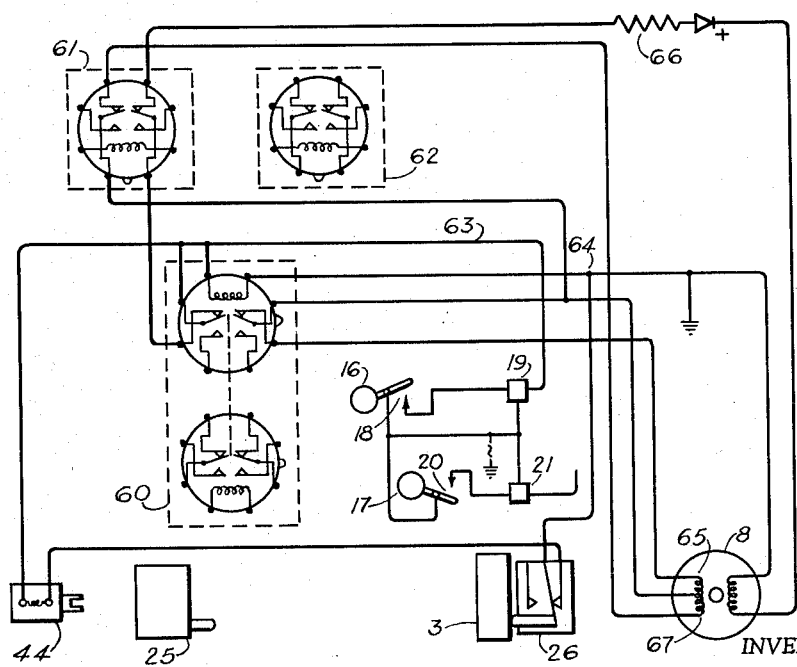
Figure 7:
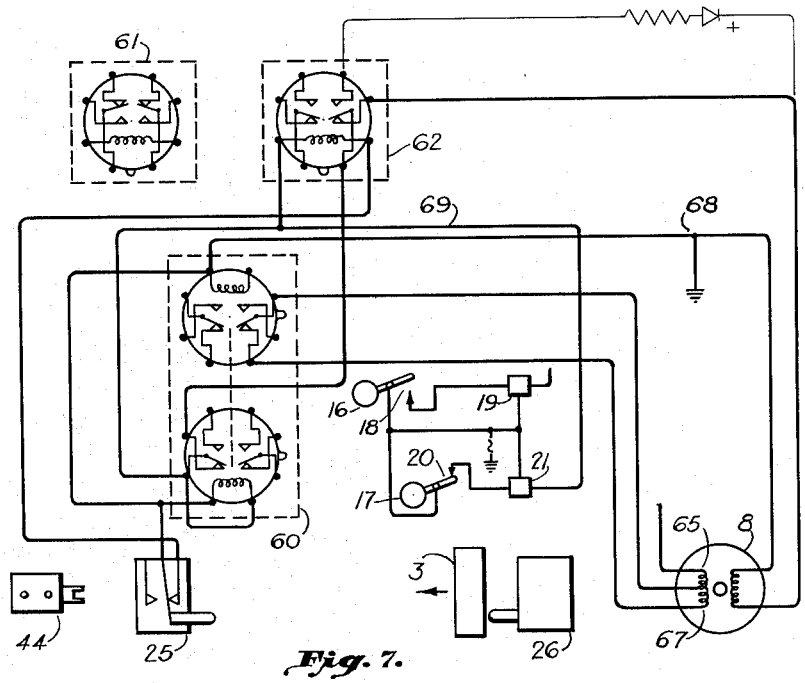
Figure 8:
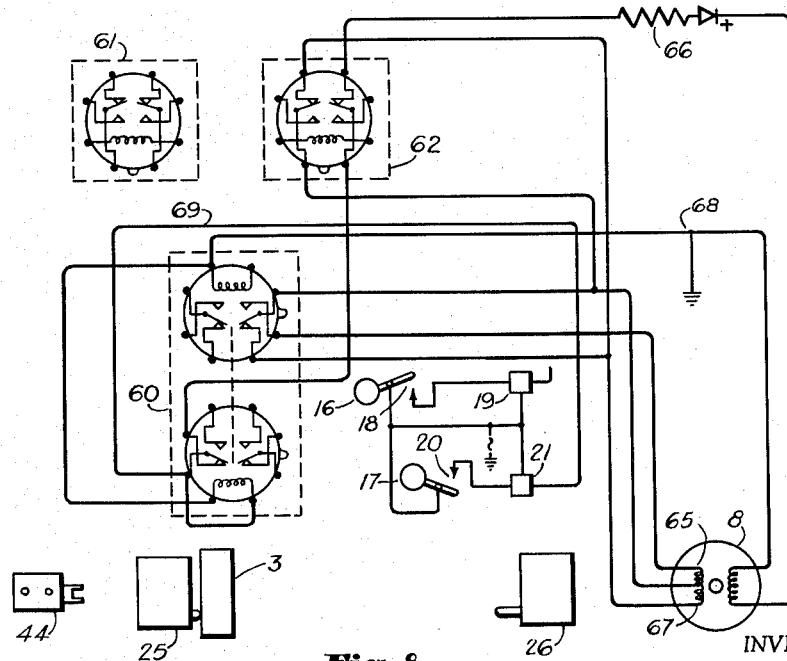

In FIG. 5, the complete circuit, through power pack 15 is shown. The energized and shorting circuits are emphasized to facilitate understanding of their function. In FIGS. 6-8 only the energized and shorting circuits are shown in order to avoid the needless complication of the complete circuit duplication of FIG. 5.

In FIG. 5 slider-block 3 is illustrated as started one-half of its reciprocation from bottom limiting switch 25 to top limiting switch 26. The closing of switch 18 by the elevation of float 16 actuates motor 8 to start this travel of slider 3. It must be appreciated that the tank will be dumped shortly after float 16 has been elevated, resulting in a lowering of float 16 and a consequent breaking of switch 18 before slider 3 has completed its travel to top limiting switch 26. Therefore, time delay relay 19 is included in the circuit to by-pass contact 18 for the predetermined length of time necessary to complete the travel of slider 3 to switch 26. Therefore, the heavier lines of the FIG. 5 circuit illustrate the condition of the circuit of power pack 15 during this travel of slider 3. Only the lines to the main winding of motor 8, the coil of forward brake relay 61, the upper coil of latching relay 60 and the forward winding of motor 8 are energized through switch 18 and time delay relay 19. The main coil of motor 8 and the coils of the relays are thus easily traced as being energized by the connection of the line supply to conductor 63. The other side of each of these coils is easily traced to grounded, common point 64.

The hot side of the main coil of motor 8 is connected through the lower contact of the right switch of relay 61 and the upper contact of the left switch of the upper section of relay 60. Forward winding 65 of motor 8 is shorted by the upper contact of the right switch of the upper section of relay 60. Forward rotation of motor 8 results, moving slider 3 to the right for the time determined by time delay relay 19.

Going now to FIG. 6, slider 3 is shown as having traveled to the right, contacting top limiting switch 26 to make its contact alternate to its normally closed contact.

This actuation of switch 26 de-energizes the coil of relay 61, returning its two switches to their alternate positions, relative to that shown in FIG. 5. Three things occur. Top limiting switch 26 now energizes solenoid 44, which impulse advances chart cylinder 43, a predetermined amount. The main winding of motor 8 is no longer directly connected to line supply but alternately connected to line supply through rectifier 66. Finally, reverse winding 67 of motor 8 is shorted through the upper contact of the left switch of relay 61. Shorting of both windings 65 and 67 of motor 8, while simultaneously applying D.-C. energy to the main winding of motor 8 dynamically brakes motor 8. Motor 8 is thereby very positively and accurately held in position electrically, in order to mechanically hold slider 3 at the precise position of contact with top limiting switch 26.

FIG. 7 is now examined as showing how slider 3 is carried from switch 26 towards switch 25 for the second half of its cycle of reciprocation. This function is initiated by the lowering of float 17 as indicative of the tank having been dumped. Switch 20 is completed at such time to energize the circuit shown in FIG. 7. As other mechanisms begin the filling of the tank, float 17 may be elevated and switch 20 broken before motor 8 carries slider 3 its full travel to bottom limiting switch 25. Therefore, time delay relay 21 is shown as performing a function similar to that performed by time delay relay 19. In this manner, the coil of reverse brake relay 62 and the bottom coil of latching relay 60 are energized by line supply along with the main winding of motor 8. The common, grounded, side of the relay coils and main motor winding can be readily traced to point 68. The connection of the relay 62 coil being completed through bottom limiting switch relay 25. The connection between the other sides of these coils, and the main winding of motor 8, can be easily traced from emergized conductor 69. Only winding 67 is now shorted. This short of winding 67 is through the lower contact of the right switch of the upper section of latching relay 60. The result is rotation of motor 8 in the reverse direction, carrying slider-block 3 toward bottom limiting switch 25.

There remains, to complete the entire cycle of operation, the description of FIG. 8. In FIG. 8, line 69 remains energized through time delay relay 21. However, slider 3 has now broken the contact of bottom limiting switch 25, de-energizing the coil of reverse brake relay 62. The alternate position of the switches of relay 62 now short forward winding 65 and apply D.-C. energy to the main winding of motor 8. Thus, motor 8 is dynamically braked to hold slider 3 at its contact point with switch 25. After time delay relay has de-energized conductor 69, the cycle of operation will repeat, the circuits taking the condition shown in FIG. 5.

Slider-block 3, as an object-body, is now seen as the central structure of this embodiment of the invention. As a means of actuating the circuit of its motive means, and as an index of the reciprocation, it defines the function which results in exhibiting the cumulative total of units of oil passing through the tank. This reciprocating action is compensated so its integration is in terms of a selected standard. The new result is evidenced by the reading of register 22.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A compensated integrator including,
    a contactor body,
    motive means arranged to reciprocate the contactor body in a fixed path,
    a power supply for the motive means,
    a control circuit between the power supply and the motive means,
    a first set of two switches included in the control circuit which are actuated alternately at two predetermined volumes of fluid in the container as the container fills and empties to establish the two volumes, whereby the contactor body is reciprocated in the path,
    a second set of switches in the control circuit which is actuated by the contactor body to dynamically brake the motive means at two points along the fixed path, and
    means for positioning at least one of the second set of switches along the path in accordance with a variable factor of the volume, whereby the length of path between the two switches of the second set is proportional to the volume emptied from the container as though the volume were at a predetermined value of the variable.

2. The integrator of claim 1 in which,
    the control circuit includes time delay relays arranged to keep the motive means connected to the power supply a predetermined length of time after each of the first set of two switches is actuated in reciprocating the contactor body in the path.

3. The integrator of claim 2 in which,
    the first set of two switches are controlled by level devices in the container responding to fluid level fluctuating in the container between two predetermined limits to carry the contactor over a complete cycle of reciprocation every time the container is filled and emptied between the two predetermined limits.

4. The integrator of claim 3 in which,
    an exhibiting means is actuated by the motive means as it reciprocates the contactor body over the length of the path between the second set of two switches to totalize the volumes of fluid dumped by the container as compensated by the variable factor.

5. The integrator of claim 4 in which,
    the motive means is an electric motor,
    the contactor body is a slider on tracks and is geared to the motor,
    and the fluid is saleable oil from a well delivered to the container between the level devices to establish the gross volumes totalized as compensated volumes dumped by the container.

6. The integrator of claim 5 in which,
    the level devices are floats, each float actuating a switch of the first set as the level of oil reaches the float to connect the motive means to the power supply in reciprocating the slider.

7. An integrating mechanism including,
    motive means,
    a power supply and circuit for the motive means,
    a first set of switches between the power supply and the circuit responding to the filling and emptying of fluid from a container to reverse the motive means,
    a slider-block geared to the motive means and guided in reciprocation as the motive means is reversed,
    a second set of switches arranged in the fixed path of the slider-block and connected in the control circuit so their actuation by the slider-block will dynamically brake the motive means at the contact points along the fixed path,
    and means responsive to a variable factor related to the net volume of fluid passed by the container with which one of the switches is positioned in the fixed path, whereby the distance between the switch points along the fixed path is made proportional to the net volume of fluid passed by the container.

8. The integrating mechanism of claim 7 in which, the motive means is clutched to a register to actuate the counter over one-half of the reciprocation cycle of the motive means in totalizing the net volume of the dump of the container.

9. The integrating mechanism of claim 8 in which a second motive means is arranged in circuit with the second set of switches to move a recording means for the magnitude of the variable factor.

10. In a lease automatic custody transfer system, a tank valved to receive and deliver saleable oil from a producing well to a point of use, level responsive means in the tank, motive means adapted to reciprocate in its direction of motion, a first set of switches in circuit between the level responsive means and the motive means to reciprocate the motive means as the tank is dumped and filled between the level responsive means, a contactor body reciprocated by the motive means in a fixed path, a second set of switches in the circuit of the motive means and actuated by the contactor body to dynamically brake the motive means at points along the fixed path, means for positioning at least one of the second set of switches along the path in accordance with a variable factor of the volume, whereby the length of the path between the switches of the second set is proportional to the volume at a predetermined value of the variable, and means for cumulatively registering the path length as the total volume passed through the tank.

References Cited in the file of this patent

UNITED STATES PATENTS

| | | |
|---|---|---|
| 844,958 | Riggs | Feb. 19, 1907 |
| 1,393,421 | Baker | Oct. 11, 1921 |
| 2,876,641 | Brown | Mar. 10, 1959 |